H. W. OSTER.
THREAD CUTTING MECHANISM.
APPLICATION FILED APR. 18, 1908.
977,540.
Patented Dec. 6, 1910.
4 SHEETS—SHEET 4.
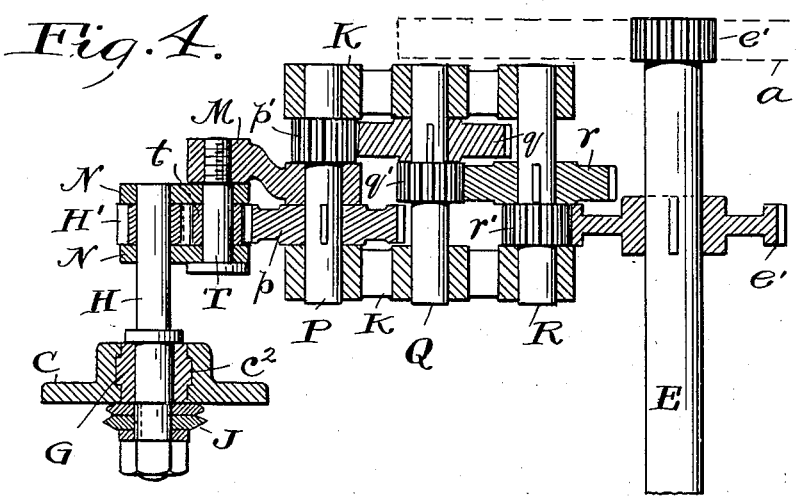
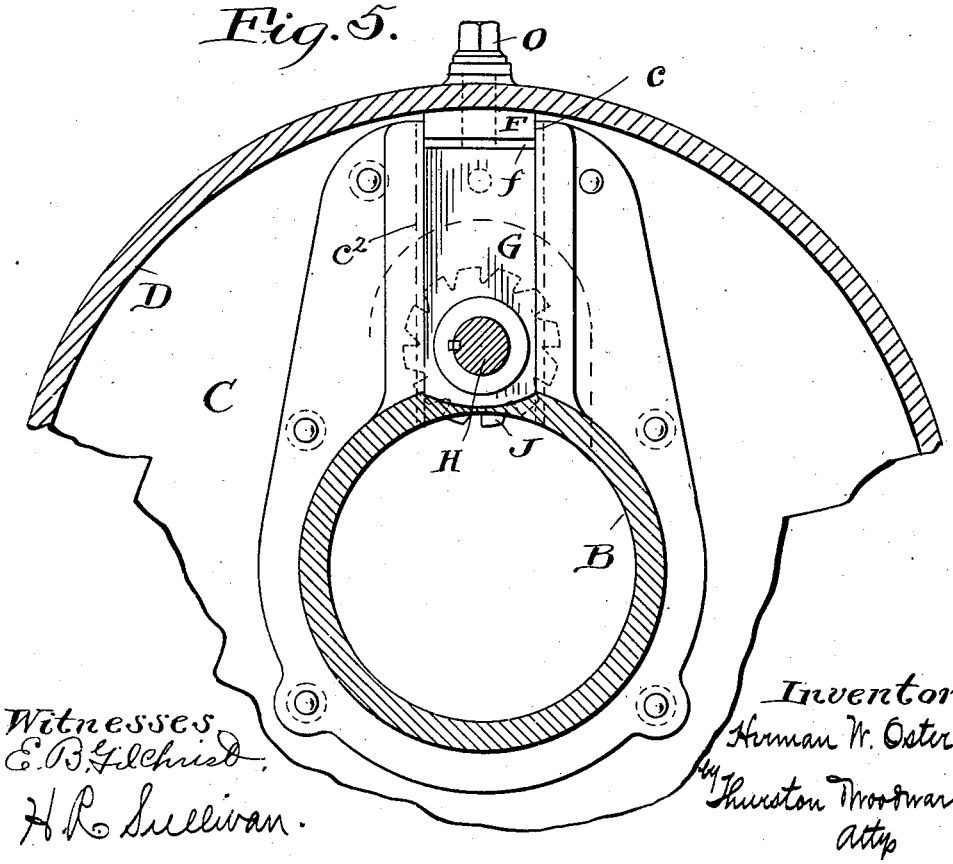

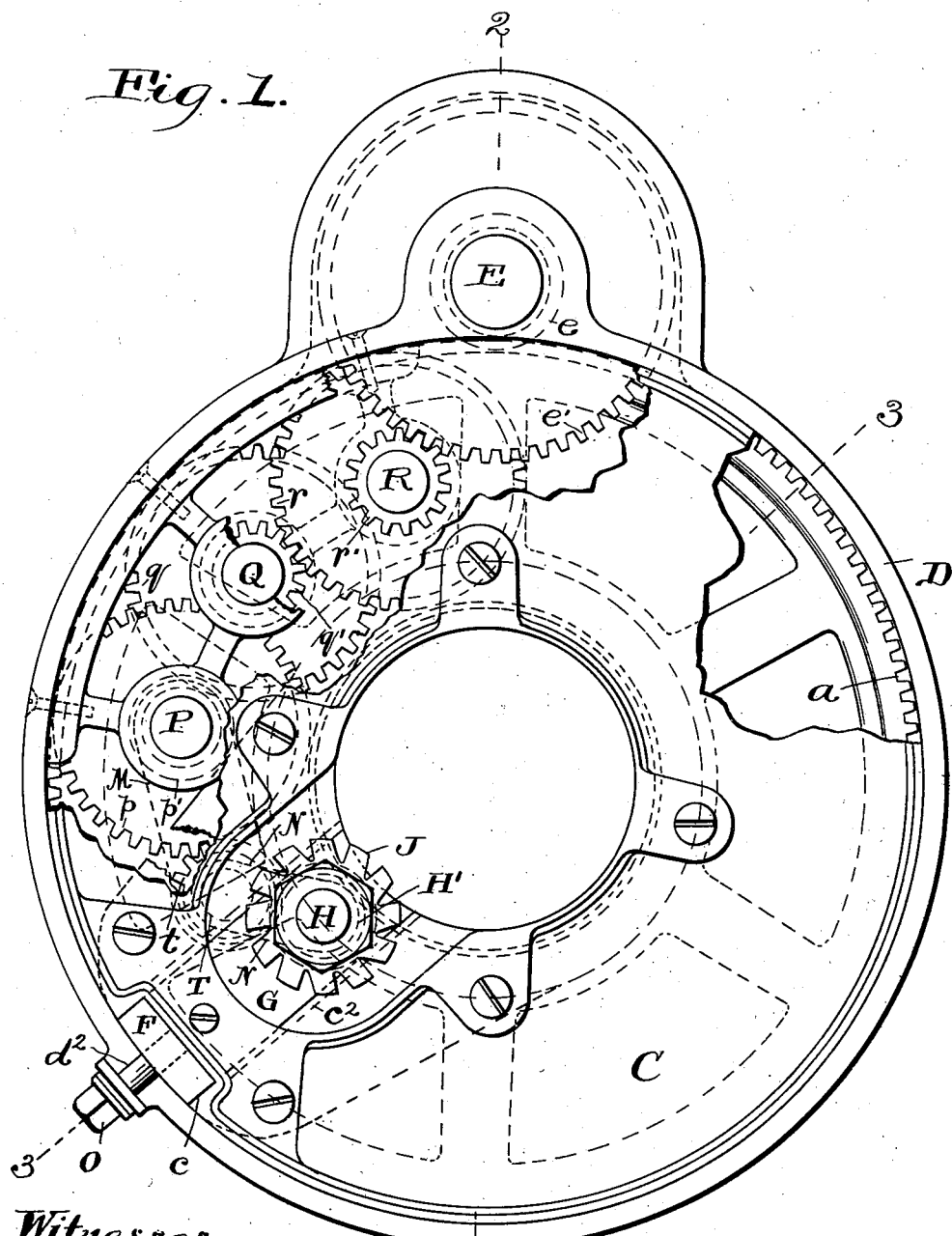

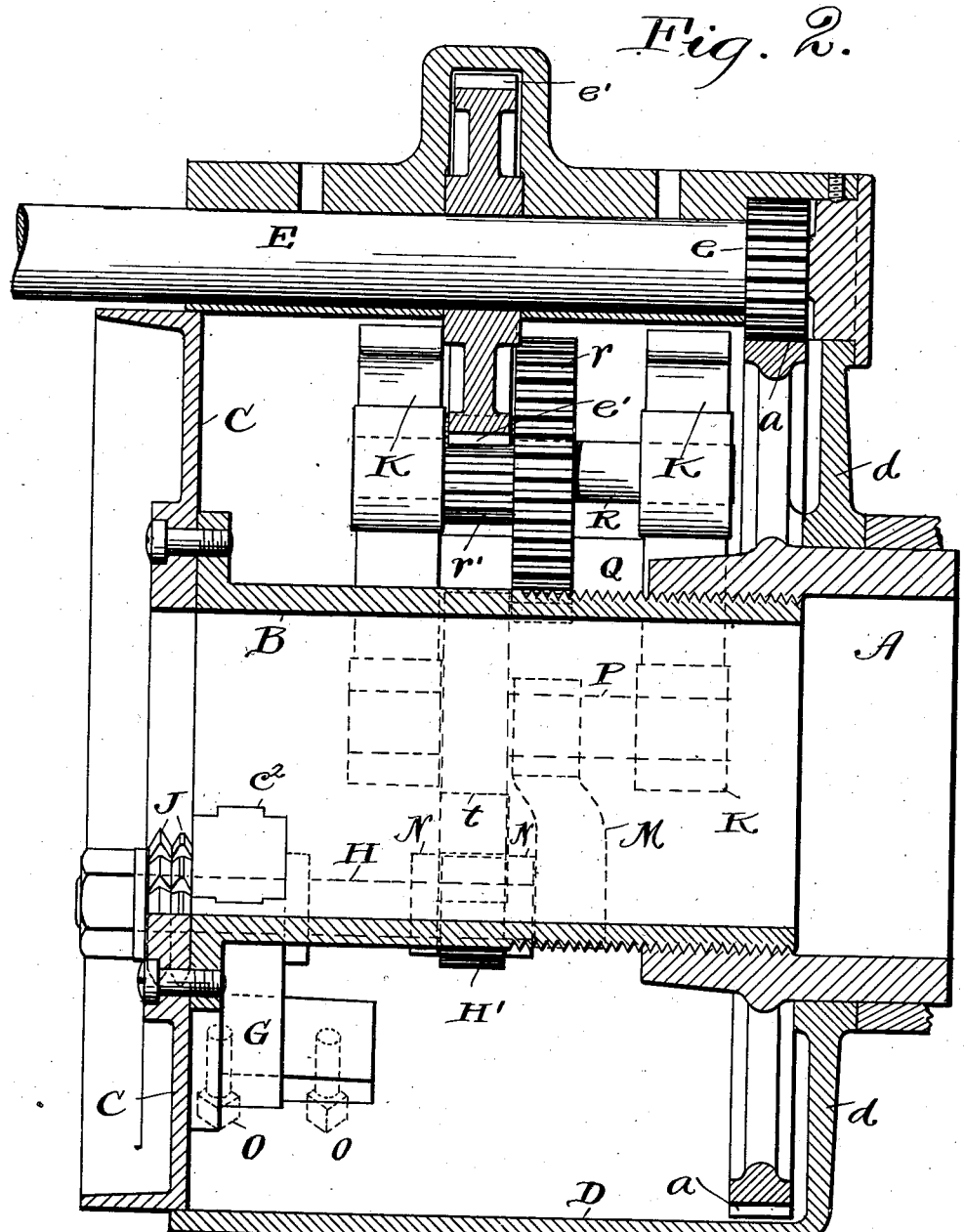

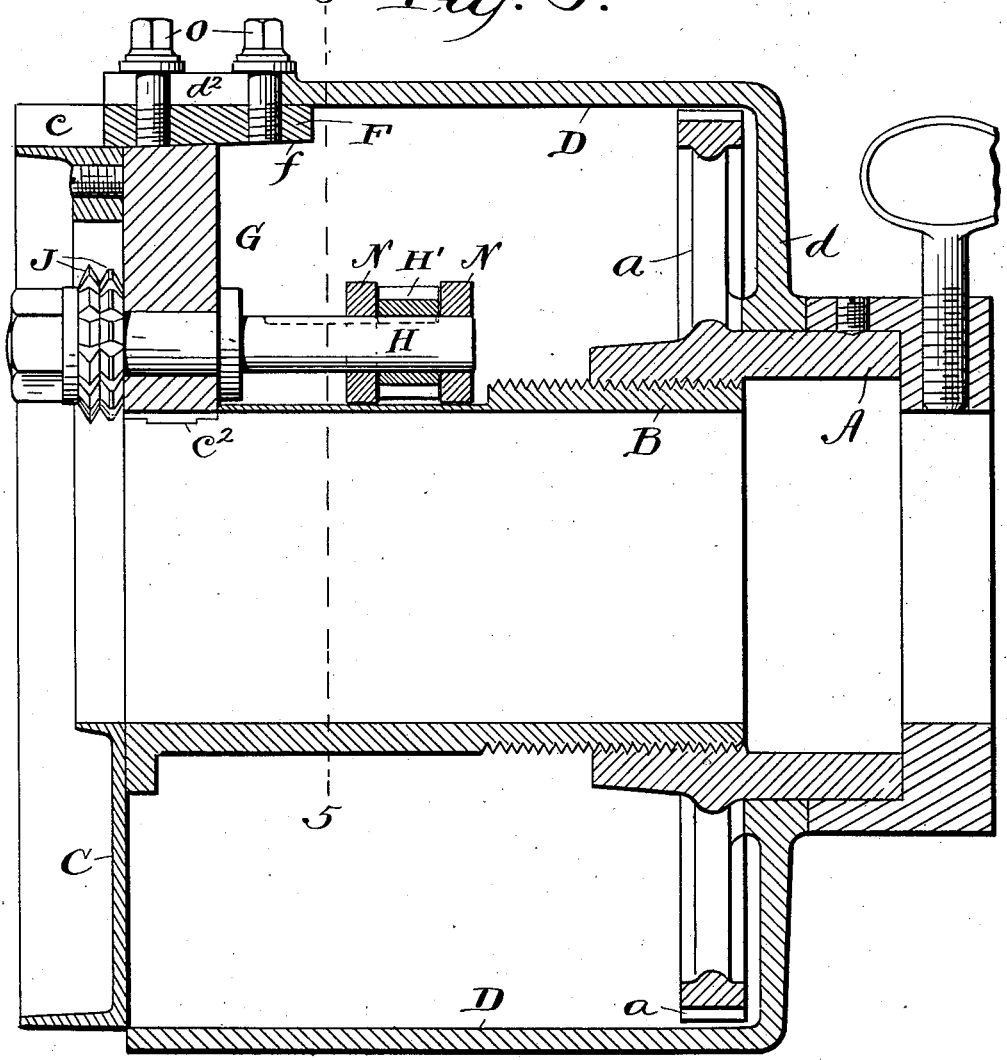

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

THREAD-CUTTING MECHANISM.

977,540.  Specification of Letters Patent.  Patented Dec. 6, 1910.

Application filed April 18, 1908. Serial No. 427,819.

*To all whom it may concern:*

Be it known that I, HERMAN W. OSTER, a citizen of the United States, residing at Cleveland, in the county of Cuyahoga and State of Ohio, have invented a certain new and useful Improvement in Thread-Cutting Mechanism, of which the following is a full, clear, and exact description.

It is the well nigh universal practice to employ chasers or dies for cutting threads on pipes and various other kinds of cylindrical stock. Such dies and chasers for the purpose are efficient, but they are not entirely satisfactory, because they are soon dulled and require frequent sharpening. I believe that some attempts have been made to use rotary cutters for cutting thread, but so far as I am aware such cutters have only been used in connection with mechanism where the stock to be threaded is rotated in contact with the rotating cutters. This is not regarded as a seriously objectionable characteristic for certain kinds of work, but mechanism of this sort would not be satisfactory for threading pipes or other long pieces of stock, principally because of the difficulty of controlling it and of handling it, and the size of the mechanism required for so doing.

The present invention is a thread cutting mechanism employing rotary cutters which, obviously will not require as frequent sharpening as dies or chasers, said cutters being mounted upon a rotary carrier which is adapted to be turned by suitable mechanism about the non-rotating stock to be threaded, and to be moved lengthwise to give the proper lead.

The invention, as shown, is embodied in the form of a portable hand operated die stock; but it is not intended that the invention, as broadly defined herein, shall be limited to a die stock, or a portable hand tool.

In the drawing, Figure 1 is an end view of a device embodying the invention, when portions of the end head plate are broken away to show the interior mechanism. Fig. 2 is a transverse section view in the plane indicated by line 2—2 of Fig. 1. Fig. 3 is a sectional view in the plane indicated by line 3—3 on Fig. 1. Fig. 4 is a development of the train of gears employed for driving the rotary cutters and of the means for supporting said cutters and permitting said support to move toward and from the axis of the stock, as hereinafter described. Fig. 5 is a sectional view in the plane indicated by line 5—5 on Fig. 3.

Referring to the parts by letters, A represents what may be called the chuck. It is a hollow cylindrical member through which the stock to be threaded may be passed, and in which said stock may be clamped in an axial position. B represents a tubular lead screw which is screwed into the chuck A.

D represents the gear carrier which is in the form of a drum having at one end an inwardly turned flange $d$ which is rotatably mounted upon the chuck A. A gear $a$ is fixed to the chuck A within the drum D. A shaft E is rotatably mounted in the drum D on an axis which is parallel with the axis of the drum, but eccentric thereto. A pinion $e$ secured to this shaft meshes with the gear $a$. This shaft E is to be turned by suitable means applied to its projecting front end. A head plate C is fixed to the front end of the tube B, and fixed within the drum D. In the periphery of this head plate C is a longitudinal groove $c$ which extends from one end to the other of the head plate. A block F having an inclined inner face $f$ is fixed to the drum D and is slidably fitted in the slot $c$. When, therefore, shaft E is turned and the chuck is fast to the stock, drum D will, of necessity, rotate upon the chuck. Because of the engagement of the block F in the groove $c$, the head plate C will rotate, and of necessity the lead tube B will rotate with it and will screw into or out of the chuck. The lead of the screw threads on the sleeve B and chuck A is the same as that of the threads to be cut upon the stock.

A slide G is secured upon the head plate C. It is held thereon in a radial guide-way $c^2$ which permits it to move toward and from the axis of the device. This slide serves as the bearing for the shaft H which is parallel with the axis of the device; and the cutters J are secured to the outer end of this shaft. The slide G engages at its outer end with the inner face of the block F, whereby the outward movement of the slide G is controlled.

A train of gears is mounted in bearing brackets K, K, which are fixed to the inner surface of the drum D. That is to say, there are three shafts P, Q and R which are mounted in these brackets. To the shaft R two gears $r$, $r'$ are fixed, the small gear being in mesh with the gear $e'$ secured to the shaft E. To the shaft Q two gears $q$, $q'$ are secured,—the latter being in mesh with the gear $r$. The gear $q$ is in mesh with the gear $p'$ secured to shaft P; and another larger gear $p$ secured to said shaft is in mesh with an idler pinion $t$, which pinion is in mesh with a pinion H' secured by a tongue and groove to the shaft H. It is through the described train of gears that the cutter shaft H is rotated with great rapidity whenever the shaft E is turned. The idler gear $t$ is rotatably mounted upon a stud T which serves as the pivot of a toggle, one link M of said toggle being an arm N loosely hung upon the shaft P, and the other link of said toggle comprising the two members N N which loosely embrace the stud T and also loosely embrace the shaft H which may slide endwise therein. Because of the described toggle, the block G is permitted to move radially toward and from the axis of the device without interrupting the connection of shaft H with its source of rotary motion above described. As has been before stated, the inner face of the block F with which the outer end of the slide G engages is inclined. That is to say, the farther removed any point of said surface is from the left end of said block the greater is the distance of that point from the axis of the device.

The operation of the device is as follows: When the stock has been inserted into the device and clamped in the chuck A, the shaft E is turned. The drum D is therefore caused to rotate upon chuck A, but cannot move endwise thereon. The engagement of the block F in the groove $c$ causes the head plate C and the lead tube B to rotate. As the tube B rotates, it screws into the chuck A at a rate corresponding with the lead of the screw thereon which, as stated, corresponds with the lead of the thread being cut by the cutters J. This movement of the tube B carries the cutters longitudinally along the stock as they are moving around the stock, and are at the same time rapidly rotating upon their own axis. During this movement of tube B, as it screws into chuck A, the slide G, by reason of its engagement with the inclined face of the block F, is permitted to move radially outward and thereby the depth of the thread cut by the cutters is gradually decreased. In other words, the device, in the form shown, is adapted to cut a tapered thread upon the stock. During the outward or inward movement of the slide G the toggle referred to will bend at its joint, but without interrupting operative engagement of the gears constituting the train above described.

If it is not desired that the device shall be adapted to cutting tapered threads, the bearing of shaft H may be so constructed that it has no movement toward and from the axis of the device. In that event, it is not necessary that any of the gears constituting the train which transmits motion from the gear $e'$ to the gear $h'$ shall be supported by a toggle. In that event also, it is unnecessary that the inner face of the block F shall be inclined, as stated. From this description, it will be understood that threads cut upon the stock may be tapered in any degree or not at all by merely varying the inclination of the inner face of the block F, or making it parallel with the axis of the stock, and making the outer end of the slide G suitably conform thereto.

In order to withdraw the threaded stock from the device after the thread has been cut on the stock, one may remove block F and to do that he has simply to loosen the cap screws O by which the block is clamped to the drum D, and then move said block endwise. This movement is permitted because the cap screws O pass through a slot $d^2$ extending from the end of the drum inward. When the block F is removed then the operator may, by pulling outward on the projecting end of the shaft H move slide G radially outward so as to entirely disengage the cutters J from the threaded stock. The devices clamping the stock in the chuck may be loosened, and the stock withdrawn. The slide G may then be moved inward and the block F replaced and fastened, and then the shaft E may be turned in the reverse direction, whereby the sleeve B will be turned in the reverse direction and unscrewed from the chuck A.

Having described my invention, I claim:

1. In thread cutting mechanism, the combination of a tubular chuck adapted to be clamped upon the stock to be threaded, a concentric tube rotatable relatively to said chuck and having a lead screw connection therewith and having also a substantially radial guide-way, a bearing block supported by said tube in said guide-way and movable therein toward and from its axis, means controlling the outward movement of said block, a cutter shaft rotatable in said block, and means for turning said tube slowly and the cutter shaft rapidly.

2. In thread cutting mechanism, the combination of a tubular chuck adapted to be clamped upon the stock to be threaded, a concentric tube rotatable relatively to said chuck and having a lead screw connection therewith, a cutter rotatably supported upon said tube, a drum rotatable about the chuck but incapable of endwise movement relative thereto, a train of gears mounted upon said drum and adapted to transmit motion to said cutter, and means compelling the tube and drum to rotate in unison.

3. In thread cutting mechanism, the combination of a tubular chuck adapted to be clamped upon the stock to be threaded, a concentric tube rotatable relatively to said chuck and having a lead screw connection therewith and a substantially radial guide-way, a bearing block supported by said tube in said guide-way and movable therein toward and from its axis, a cutter shaft rotatably supported in said block, means controlling the outward movement of said block, a drum rotatable about the chuck but incapable of endwise movement relative thereto, a train of gears mounted upon said drum a toggle whose links are respectively pivoted upon an axis coincident with the axis of the last gear of said train and with the axis of the cutter shaft, an idler gear mounted on the pivot of said toggle in mesh with the last gear of said train, and a gear in mesh with said idler gear having a tongue and groove connection with the cutter shaft.

4. In thread cutting mechanism, the combination of a tubular chuck adapted to be clamped upon the stock to be threaded, a concentric tube rotatable relatively to said chuck and having a lead screw connection therewith, a bearing block supported by said tube and movable toward and from its axis, a cutter shaft rotatable in said block, a drum rotatable upon said chuck but incapable of endwise movement relative thereto, means compelling said drum and tube to rotate in unison, and an inclined surface carried by said drum with which the outer end of said bearing block engages, and mechanism for rotating said cutter shaft rapidly and said drum slowly.

5. In thread cutting mechanism, the combination of a tubular chuck adapted to be clamped upon the stock to be threaded, a concentric tube rotatable relatively to said chuck and having a lead screw connection therewith, a head plate fixed to said tube having a longitudinal groove in its periphery, a bearing block mounted in guideways on said head plate, a drum rotatable upon said chuck but incapable of movement relative thereto, a block fixed to said drum and projecting into the slot of the head plate and engaging on its inner face with the outer end of said bearing block, a cutter shaft rotatable in said bearing block, and means for turning the drum and cutter shaft.

6. In thread cutting mechanism, the combination of a tubular chuck adapted to be clamped upon the stock to be threaded, a concentric tube rotatable relatively to said chuck and having a lead screw connection therewith, a cutter rotatably supported upon said tube, a drum rotatable about the chuck but incapable of endwise movement relative thereto, a train of gears mounted upon said drum and adapted to transmit motion to said cutter, and means compelling the tube and drum to rotate in unison, a shaft rotatably mounted in said drum on an axis parallel with the axis of the drum, a gear secured to said shaft, and a gear fixed to said chuck in mesh therewith, and a train of mechanism transmitting motion from said shaft to the rotatable cutter.

7. In a thread cutting mechanism, the combination of a tubular chuck adapted to be clamped on the stock to be threaded, a concentric tube rotatable relatively to said chuck and having a lead screw connection therewith, a shaft bearing supported by said tube and movable thereon toward and from the axis of said tube, a shaft mounted in said bearing, a cutter secured to said shaft, means for turning said tube and shaft simultaneously about their respective axes, a pattern plate controlling the movement of said shaft bearing away from the axis of the tube, and a member to which said pattern plate is fixed,—which member is rotatable on the chuck but has no longitudinal movement relative thereto.

8. In a thread cutting machine, the combination of a tubular chuck adapted to be clamped on to the stock to be threaded, a concentric tube rotatable relative to said chuck, means for moving said tube longitudinally relative to the chuck as the tube is turned, a shaft bearing supported by said tube and movable thereon toward and from the axis of the tube, a shaft mounted in said bearing, a cutter secured to said shaft, means for turning said tube and shaft simultaneously about their respective axes, a pattern plate controlling the movement of said shaft bearing away from the axis of the tube, and a member to which said pattern plate is fixed,—which member is rotatable on the chuck but has no longitudinal movement relative thereto.

In testimony whereof, I hereunto affix my signature in the presence of two witnesses.

HERMAN W. OSTER.

Witnesses:
E. L. THURSTON,
R. B. TEWKSBURY.